Patented Nov. 14, 1933

1,934,771

UNITED STATES PATENT OFFICE 1,934,771

VAT DYESTUFFS OF THE ANTHRAQUINONE SERIES AND A PROCESS OF PREPARING THEM

Johann Rosenbach, Wiesbaden, and Willy Lassmann, Frankfort-on-the-Main, Germany, assignors to General Aniline Works, Inc., New York, N. Y., a corporation of Delaware No Drawing. Application December 15, 1931, Serial No. 581,268, and in Germany December 17, 1930

10 Claims. (Cl. 260—60)

The present invention relates to vat dyestuffs and to a process of preparing them.

More particularly it relates to a process which comprises condensing an α-amino-anthraquinone compound with a compound of the general structure:

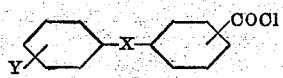

wherein X stands for

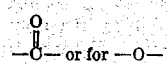

and Y for hydrogen or the —COCl—group, by heating the components in the presence of an inert solvent.

As α-amino-anthraquinone compounds there may be used, for instance, 1-amino-anthraquinone, 1-amino-4-benzoyl-amino-anthraquinone, 1-amino-5-benzoyl-amino-anthraquinone, 1-amino-4-methoxy-anthraquinone or the like.

As compounds of the above general formula there may be used, for instance, diphenyl-ethers and benzophenones containing one COCl—group, for instance, in 3- or 4-position or such compounds as contain two COCl—groups, for instance, in 4.4'-, 3.3'-, 4.3'- or 4.2'-position. In the nuclei of diphenyl-ether-carboxylic acid chlorides or benzophenone-carboxylic acid chlorides there may also be contained substituents in any positions without the condensation with α-amino-anthraquinone compounds becoming inoperative thereby.

Instead of the above mentioned carboxylic acid chlorides there may be used with the same result an equivalent thereof, for instance, carboxylic acid bromides.

As solvents there may be used, for instance: nitrobenzene, chlorobenzene, pure or technical trichlorobenzene, benzene or an excess of the diphenylether-carboxylic acid chloride or benzophenone-carboxylic acid chloride used in each particular case.

The condensation is effected by heating the reaction components, preferably at a temperature between about 80° C. and about 210° C. In some cases, it is also advantageous to add to the reaction mixture an acid binding agent, since during the reaction halogen hydracid is set free.

In this manner new dyestuffs of the following general structure:

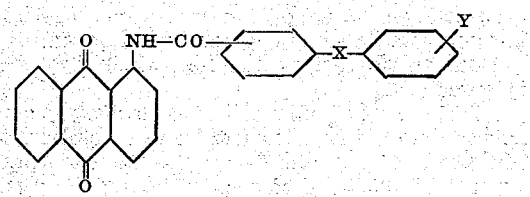

wherein X stands for

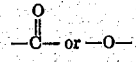

Y for hydrogen or a group of the following general structure:

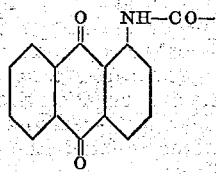

are obtainable. For the most part they have a yellow to red shade; they dye the animal and vegetable fiber from the vat clear tints and possess a very great affinity for the fiber and a great dyeing power, as compared with the known acyl-derivatives of amino-anthraquinones obtainable, for instance from benzoic acid or naphthoic acid. In view of these properties and of the very good fastness properties the new dyestuffs constitute a valuable enrichment of the class of vat dyestuffs.

The following examples serve to illustrate the invention, but they are not intended to limit it thereto, the parts being by weight:

(1) 10 parts of 4.4'-diphenylether-dicarboxylic acid chloride [obtainable by treating 4.4'-diphenylether-dicarboxylic acid with phosphorus pentachloride (cf. U. S. Patent No. 1,717,424)] and 15.2 parts of 1-amino-anthraquinone are heated in 600 parts of nitrobenzene for several hours at about 120° C. The dyestuff separates in the form of a yellow, crystalline precipitate. It is filtered by suction, while hot, washed first with warm nitrobenzene and then with alcohol and dried. The yield is good. The dyestuff is a yellow, crystalline product which is soluble in warm chlorobenzene, nitrobenzene and trichlorobenzene, dissolves in strong sulfuric acid to an orange-red solution and dyes the animal and vegetable fiber from a red alkaline hydrosulfite vat clear, greenish-yellow tints of very good fastness properties.

(2) 28 parts of 4.4'-diphenylether-dicarboxylic acid chloride are dissolved in 1200 parts of nitrobenzene and 65.1 parts of 1-amino-5-benzoylamino-anthraquinone are added thereto. After stirring for several hours at about 120° C., the yellow precipitate is filtered by suction, washed with a small quantity of alcohol and dried. The dyestuff is difficultly soluble in trichlorobenzene and nitrobenzene; it dissolves in concentrated sulfuric acid to a brownish-red solution. It dyes the animal and vegetable fiber from a Bordeaux-red vat intense, bright yellow tints of excellent fastness properties.

(3) 20 parts of diphenylether-4.4'-dicarboxylic acid chloride and 34.4 parts of 1-amino-4-methoxy-anthraquinone are heated in 600 parts of nitrobenzene for several hours at 150° C. The dyestuff, which precipitates, is filtered by suction, washed with alcohol and dried. It is obtained in a good yield and forms an orange-red product which dyes cotton from the alkaline hydrosulfite vat very fast orange tints.

By using instead of 1-amino-4-methoxy-anthraquinone, 1-amino-4-benzoylamino-anthraquinone, a product is obtained which dyes the fiber red tints.

(4) 25 parts of diphenylether-4-carboxylic acid chloride are introduced into a hot solution of 34.4 parts of 1-amino-5-benzoyl-amino-anthraquinone in 100 parts of trichlorobenzene and the whole is kept boiling for half an hour. On cooling, the dyestuff precipitates from the solution, it is filtered by suction and washed with benzene and alcohol. It dyes cotton from the alkaline hydrosulfite vat intense, bright yellow tints.

(5) By using in Example 4 instead of 1-amino-5-benzoyl-amino-anthraquinone the corresponding quantity of 1-amino-4-methoxy-anthraquinone, a product is obtained which dyes the vegetable fiber clear, orange-red tints.

By effecting the condensation according to Example 4 in benzene with 1-amino-anthraquinone, a product is obtained which dyes cotton and wool from the vat yellow tints.

(6) 34 parts of 1-amino-5-benzoylaminoanthraquinone are heated to boiling with 1000 parts of trichlorobenzene and 34 parts of 4-benzoyldiphenylether-4'-carboxylic acid chloride are added to the hot solution. The solution is kept boiling for half an hour and the dyestuff, which precipitates on cooling, is filtered by suction. It dyes cotton from the alkaline hydrosulfite vat bright yellow tints.

(7) By using in Example 6 instead of 1-amino-5-benzoyl-amino-anthraquinone, 1-amino-4-methoxy-anthraquinone, a product is obtained which dyes cotton orange tints.

(8) 13.2 parts of 1-amino-5-benzoyl-amino-anthraquinone are introduced into a solution of 10 parts of 4-methyl-benzophenone-4'-carboxylic acid chloride (obtainable according to Annalen der Chemie 312, page 94) in 600 parts of nitrobenzene and the whole is stirred for several hours at about 180° C. By this operation a yellow dyestuff is precipitated which may be recrystallized from chlorobenzene. It dyes cotton from a violet vat intense, yellow tints of excellent fastness properties. The dyestuff dissolves in concentrated sulfuric acid to an orange solution. It is obtained in a good yield.

(9) 10 parts of benzophenone-4.4'-dicarboxylic acid are dissolved in 34 parts of phosphorus oxychloride and 16 parts of phosphorus pentachloride are introduced in this solution. After heating for a prolonged time, the whole has become entirely dissolved. After filtering by suction, the solvent is distilled off in a vacuum and the residue is taken up in nitrobenzene. A solution of 25.5 parts of 1-amino-4-benzoyl-amino-anthraquinone in 600 parts of nitrobenzene is then added to the acid chloride solution and the whole is stirred for several hours at about 180° C. On cooling, the dyestuff separates in the form of a violet, crystalline precipitate which is washed first with alcohol and then with water and finally dried. It dissolves in concentrated sulfuric acid to a red solution and dyes cotton from a Bordeaux-red vat red tints of very good fastness properties. The yield is good.

(10) 20 parts of benzophenone-4.4'-dicarboxylic acid chloride and 44.7 parts of 1-amino-5-benzoyl-amino-anthraquinone in 600 parts of nitrobenzene are stirred for several hours at about 180° C. The dyestuff separates in the form of a yellow, crystalline precipitate. It is difficultly soluble in solvents of high boiling point as, for instance, trichlorobenzene and nitrobenzene; it dissolves in concentrated sulfuric acid to an orange-red solution and dyes the animal and vegetable fiber from a Bordeaux-red vat intense, bright yellow tints of excellent fastness properties.

(11) 10 parts of benzophenone-4.4'-dicarboxylic acid chloride and 16.4 parts of 1-amino-4-methoxy-anthraquinone are dissolved in 600 parts of nitrobenzene and the whole is stirred for several hours at about 160° C. The dyestuff thus obtained is filtered by suction at about 100° C. and washed with alcohol; it dissolves in warm solvents of high boiling point such as chlorobenzene, trichlorobenzene and nitrobenzene. It dissolves in concentrated sulfuric acid to an orange-red solution and in an alkaline hydrosulfite solution to a brown-red vat from which it dyes cotton orange tints of good fastness properties.

Similar products are obtainable by using instead of benzophenone-4.4'-dicarboxylic acid chloride, benzophenone-3.3'-, -4.3'- or -4.2'-dicarboxylic acid chloride.

We claim:

1. The process which comprises condensing an α-amino-anthraquinone compound with a compound of the general structure:

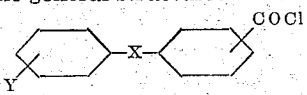

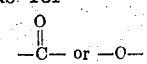

wherein X stands for $$-\overset{O}{\underset{\|}{C}}- \text{ or } -O-$$

and Y for hydrogen or the —COCl— group, by heating the components in the presence of an inert solvent.

2. The process which comprises condensing an α-amino-anthraquinone compound of the group consisting of 1-amino-anthraquinone, 1-amino-4-methoxy-anthraquinone, 1-amino-4-benzoyl-amino-anthraquinone and 1-amino-5-benzoyl-amino-anthraquinone with a compound of the following formula:

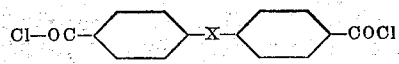

wherein X stands for

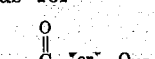

by heating the components in the presence of a solvent of the group consisting of nitrobenzene, chlorobenzene and trichlorobenzene at a temperature between about 80° C. and about 210° C.

3. The process which comprises condensing 1-amino-anthraquinone with 4.4'-diphenyl-ether-dicarboxylic acid chloride by heating the components in the presence of nitrobenzene at a temperature of 120° C. for some hours.

4. The process which comprises condensing 1-amino-4-methoxy-anthraquinone with 4.4'-diphenyl-ether-dicarboxylic acid chloride by heating the components in the presence of nitrobenzene at a temperature of 150° C. for some hours.

5. The process which comprises condensing 1-amino-5-benzoylamino-anthraquinone with benzophenone-4.4'-dicarboxylic acid chloride by heating the components in the presence of nitrobenzene at a temperature of 180° C. for some hours.

6. As new products, the compounds of the general structure:

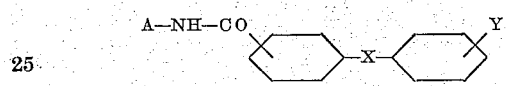

wherein A stands for an α-bound anthraquinone compound, X stands for

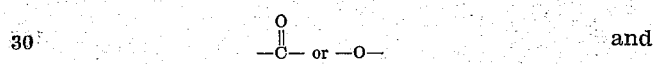

and Y for hydrogen or a group of the general structure:

A—NH—CO—

A having the above meaning, having a yellow to red shade, dyeing the animal and vegetable fiber from the vat clear tints and possessing a great affinity for the fiber and a great dyeing power.

7. As new products, the compounds of the general structure:

wherein X stands for

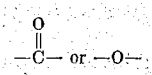

and Y for a radical of the group consisting of:

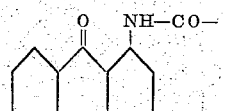

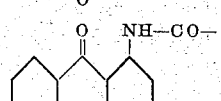

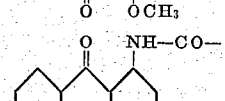

and

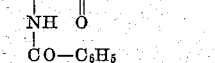

8. As a new product, the compound of the following structure:

being difficultly soluble in trichlorobenzene and nitrobenzene, dissolving in concentrated sulfuric acid to a brownish-red solution and dyeing the animal and vegetable fiber from a Bordeaux-red vat intense, bright yellow tints of excellent fastness properties.

9. As a new product, the compound of the following structure:

being an orange-red product and dyeing cotton from the alkaline hydrosulfite vat very fast orange tints.

10. As a new product the compound of the following structure:

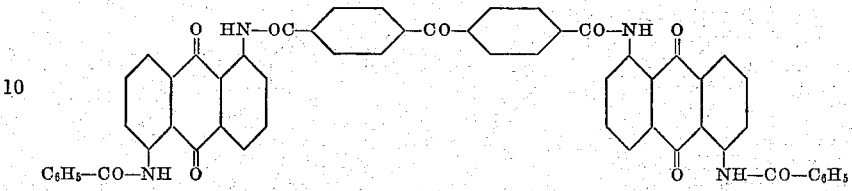

being a yellow crystalline product dissolving in concentrated sulfuric acid to an orange-red solution and dyeing the animal and vegetable fiber from a Bordeaux-red vat intense, bright yellow tints of excellent fastness properties.

JOHANN ROSENBACH.
WILLY LASSMANN.